(12) United States Patent
Hoopes

(10) Patent No.: US 7,417,084 B2
(45) Date of Patent: Aug. 26, 2008

(54) RUBBER COMPOUND CONTAINING AN ORGANOTHIOSULFATE AND A BISMALEIMIDE

(75) Inventor: Thomas Holden Hoopes, Sharon Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 409 days.

(21) Appl. No.: 11/021,342

(22) Filed: Dec. 22, 2004

(65) Prior Publication Data

US 2006/0135660 A1   Jun. 22, 2006

(51) Int. Cl.
*C08K 5/34* (2006.01)
(52) U.S. Cl. ........................ 524/105; 524/157
(58) Field of Classification Search .......... 524/105, 524/157
See application file for complete search history.

(56) References Cited

U.S. PATENT DOCUMENTS

| 4,269,250 | A | 5/1981 | Harrison |
| 4,704,334 | A | 11/1987 | Delseth et al. |
| 5,985,963 | A * | 11/1999 | D'Sidocky et al. .......... 524/105 |
| 6,326,438 | B1 | 12/2001 | D'Sidocky et al. |
| 6,566,449 | B2 * | 5/2003 | Sugimoto et al. ........... 525/180 |

FOREIGN PATENT DOCUMENTS

GB    2360784    10/2001

OTHER PUBLICATIONS

European Patent Office, *Extended European Search Report*, corresponding European patent application 05112206.7-2425; Jan. 31, 2006.

* cited by examiner

*Primary Examiner*—Peter D. Mulcahy
(74) *Attorney, Agent, or Firm*—Wood, Herron & Evans, L.L.P.

(57) ABSTRACT

A rubber composition including one or more bismaleimides and/or organothiosulfates, while at the same time having a reduced amount of sulfur, provides for excellent final rubber vulcanizate physical properties, including improved adhesion to metal reinforcement. The composition may be used to form several products, for example, coated metal, coated wire, coated cord, tires, hoses, belts, and shoe soles.

15 Claims, No Drawings

RUBBER COMPOUND CONTAINING AN ORGANOTHIOSULFATE AND A BISMALEIMIDE

BACKGROUND OF THE INVENTION

Developing rubber compounds containing high sulfur levels has been a serious problem for the rubber industry, and one which has received a great deal of attention. Problems attributable to high levels of sulfur in the rubber include migration of the sulfur to the surface of the rubber stock, commonly referred to as "bloom", which causes decrease of tack at the surface of the rubber stock.

Compounds containing high sulfur levels can exhibit problems with sulfur bloom on the surface of the unvulcanized rubber. This surface layer of sulfur crystallizes, causing a loss of building tack which can cause problems in tire building, such as decreased calendar speed and problems in storage of components.

Numerous modifications of standard rubber processing techniques have been utilized to minimize the sulfur bloom tendencies. These prior methodologies include: the use of insoluble sulfur in the compound; limiting the compound mixing temperatures during the sulfur addition stage; and minimizing the heat history that the compound is exposed to during processing. However, these modifications have led to mixed results.

For example, insoluble sulfur is formed by rapidly quenching molten sulfur that is above 159° C. (preferably 200 to 250° C.), and consists primarily of long chain sulfur molecules and a lesser amount of soluble $S_8$ rings. But there is a tendency for the long chain molecules to revert to the more stable soluble form if exposed to higher temperatures, long storage times, and/or hostile storage environments. To reduce this tendency, commercial insoluble sulfur products contain a stabilizer.

When insoluble sulfur is mixed in a rubber compound, it exists as more or less discreet particles of varying size in the rubber phase. However, above about 118° C., substantial reversion to the soluble sulfur form occurs, thereby resulting in sulfur bloom.

Another approach to the sulfur bloom problem has been to use a low-sulfur rubber compound. Low-sulfur rubber compounds may be obtained by use of suitable sulfur vulcanizing agents, for example, elemental sulfur (free sulfur), optionally in combination with a sulfur donating vulcanizing agent, for example, an amine disulfide, polymeric polysulfide, or sulfur olefin adducts. However, with this approach, adhesion of the rubber compound to reinforcement such as steel wire, steel cord, or the like may be compromised.

Accordingly, there is a need for a rubber composition in which sulfur bloom, and the resulting loss of surface tack, is reduced or avoided over a wider temperature range, without compromising adhesion of the rubber compound to a reinforcement material.

SUMMARY OF THE INVENTION

The above-mentioned limitations and drawbacks are overcome by the present invention, which avoids the sulfur bloom and resulting loss of tack, while at the same time providing good adhesion between the rubber compound and a metallic reinforcement material. These and other benefits and advantages are accomplished by providing a rubber composition that includes one or more bismaleimides and/or organothiosulfates, while at the same time having a reduced amount of sulfur.

DETAILED DESCRIPTION OF SEVERAL EMBODIMENTS OF THE INVENTION

If desired, the rubber composition may include:
(A) a rubber selected from the group consisting of natural rubber, a rubber derived from one or more diene monomers, and mixtures thereof;
(B) from about 0.05 to about 10 phr of an organothiosulfate; and
(C) from about 0.1 to about 10 phr of a bismaleimide compound of the general formula:

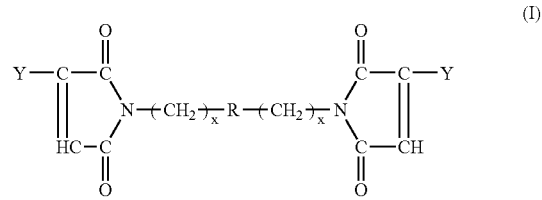

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms, R optionally may contain one or more hetero atoms selected from O, N, and S, X is 0 or an integer from 1 to 3, and Y is hydrogen or —$CH_3$.

The term "phr" as used herein, and according to conventional practice, refers to "parts by weight of a respective material per 100 parts by weight of rubber, or elastomer".

Non-limiting examples of compounds or classes of organothiosulfates that may be used in the rubber composition include the salts and hydrated salts: of n-butylthiosulfate, n-pentylthiosulfate, isopentyithiosulfate, n-hexylthiosulfate, isohexylthiosulfate, n-heptyithiosulfate, isooctylthiosulfate, 2-ethylhexylthiosulfate, and the straight- and branched-chain dodecylthiosulfates, hexadecyl thiosulfates and octadecylthiosulfates; of prop-2-enylthiosulfate, but-2-enylthiosulfate, pent-3-enylthiosulfate, hex-3-enylthiosulfate, oct-3-enylthiosulfate and dodec-4-enylthiosulfate; of 3-chloropropylthiosulfate, 4-chlorobutylthiosulfate, 6-chlorohexylthiosulfate and 10-chlorodecylthiosulfate; of benzylthiosulfate, 1, phenylethylthiosulfate, 2-phenylethylthiosulfate, 4-phenylbutylthiosulfate, 3-phenylpentylthiosulfate and the various isomeric phenyloctyl-, phenylnonyl- and phenyldodecylthiosulfates; of 2,5-dihydroxyphenylthiosulfate; of ethylene bisthiosulfate, pentamethylene-1,4-bisthiosulfate, hexamethylene-1,6-bis thiosulfate, heptamethylene-1,7-bis thiosulfate, octamethylene-1,8-bis thiosulfate, nonamethylene-1,9-bis thiosulfate, decamethylene-1,10-bis thiosulfate, dodecamethylene-1,1 2-bis thiosulfate and hexadecamethylene-1,16-bis thiosulfate; and of but-2-ene-1,4-bis thiosulfate, pent-2-ene-1,5-bis thiosulfate, hex-3-ene-1,6-bis thiosulfate, oct-4-ene-1,8-bis thiosulfate, octa-2,6-diene-1,8-bis thiosulfate and octa-3,5-diene-1,8-bis thiosulfate. If desired, the salts and hydrated salts may include one or more of sodium, magnesium, calcium, barium, zinc, cobalt, and nickel. In one embodiment, the organothiosulfate is hexamethylene-1,6-bis thiosulfate, available from Monsanto as DURALINK® HTS.

The organothiosulfate used in the present invention may be added to the rubber by any conventional technique, such as on mill or in a Banbury mixer. The amount of organothiosulfate may vary widely depending on the typw of rubber and other compounds present in the vulcanizable composition. Generally, the amount of organothiosulfate used is in a range of from about 0.05 to about 10 phr, advantageously from about 3 to about 5 phr.

The bismaleimide is generally present in an amount of from about 0.1 to about 10 phr, advantageously from about 0.5 to about 2 phr.

Various bismaleimide compounds are disclosed in U.S. Pat. No. 5,985,963, the entire disclosure of which is incorporated into this patent document by reference. Non-limiting examples of bismaleimides that may be used in the present invention include N,N'-ethylenebismaleimide, N,N'-hexamethylenebismalemide,N,N'-dodecamethylenebismaleimide, N,N'-(2,2,4-trimethylhexamethylene)bismaleimide, N,N'-(oxy-dipropylene)bismaleimide, N,N'-(aminodipropylene)-bismaleimide, N,N'-(ethylenedioxydipropylene)-bismaleimide, N,N'(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene)bismaleimide, N,N'-p-(phenylene)-bismaleimide, N,N'-(o-phenylene)bismaleimide, N,N'-(1,3-naphthylene)bismaleimide, N,N'-(1,4-naphthylene)-bismaleimide, N,N'-(1,5 -naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-(2,6-pyridyl)-bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)-bismaleimide, N,N'-(5-hydroxy-1,3-phenylene)-bismaleimide, N,N'-(5-methoxy-1,3-phenylene)-bismaleimide, N,N'-(m-xylylene)bismaleimide, N,N'-(p-xylylene)bismaleimide, N,N'-(methylenedi-p-phenylene)-bismaleimide, N,N'-(isopropylidenedi-p-phenylene)-bismaleimide, N,N'-(oxydi-p-phenylene)bismaleimide, N,N'-(thiodi-p-phenylene)bismaleimide, N,N-(dithiodi-p-phenylene)bismaleimide, N,N'-(sulfodi-p-phenylene)-bismaleimide, N,N'-(carbonyldi-p-phenylene)-bismaleimide, α,α-bis-(4-maleimidophenyl)-meta-diisopropylbenzene, α,α-bis-(4-p-phenylene) bismaleimide, N,N'-m-xylylene-bis-citraconic imide and α,α-bis-(4-maleimidophenyl)-para-diisopropylbenzene. In one embodiment, the bismaleimide is N,N'-(m-phenylene)bismaleimide, available from DuPont as HVA-®.

Non-limiting examples of rubbers for use in the present invention include substituted and unsubstituted, saturated and unsaturated, natural and synthetic polymers. The natural polymers include natural rubber in its various forms, e.g., pale crepe, smoked sheet, balata, and gutta percha. The synthetic polymers are derived from one or more diene monomers, and include those prepared from a single monomer (homopolymer) or a mixture of two or more copolymerizable monomers (copolymer). If two or more monomers are used, the monomers may be combined in the random-distribution form or in the block form, if desired. The monomers may be substituted or may be unsubstituted, and may possess one or more double bonds. They may include: conjugated dienes; non-conjugated dienes; and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of non-conjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are: polychloroprene homopolymers of a conjugated 1,3-diene such as isoprene and butadiene, and in particular, polyisoprenes and polybutadienes having essentially all of their repeat units combined in a cis-1,4-structure; copolymers of a conjugated 1,3-diene such as isoprene and butadiene with up to 50 percent by weight of at least one co-polymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

If desired, one or more of the following rubbers may be used to advantage: cis-1,4-polyisoprene (natural or synthetic); polybutadiene; polychloroprene; the copolymers of isoprene and butadiene; copolymers of acrylonitrile and butadiene; copolymers of acrylonitrile and isoprene; copolymers of styrene, butadiene, and isoprene; copolymers of styrene and butadiene; and blends thereof.

As known to one skilled in the art, in order to cure a rubber stock, one needs to have a sulfur vulcanizing agent. Examples of suitable sulfur vulcanizing agents include: elemental sulfur (free sulfur); a sulfur donating vulcanizing agent, for example, an amine disulfide, a polymeric polysulfide, or a sulfur olefin adduct; and combinations thereof. Advantageously, the sulfur vulcanizing agent may be elemental sulfur. The amount of sulfur vulcanizing agent will vary depending on the components of the rubber stock and the particular type of sulfur vulcanizing agent that is used. The sulfur vulcanizing agent is generally present in an amount ranging from about 0.5 to about 7 phr. Advantageously, the sulfur vulcanizing agent is present in an amount ranging from about 0.75 phr to about 5 phr.

Conventional rubber additives may be incorporated in the rubber stock of the present invention. The additives commonly used in rubber stocks include fillers, plasticizers, waxes, processing oils, retarders, antiozonants, antioxidants, and the like. If desired, the total amount of filler that may be used may range from about 30 to about 150 phr, advantageously from about 45 to about 100 phr. Examples of fillers include clays, calcium carbonate, calcium silicate, titanium dioxide, and carbon black. Representatives carbon blacks that are commonly used in rubber stocks include N-326, N-330, N-472, N-550, N-660, N-754, N-762, N-765 and N-990. Plasticizers are conventionally used in amounts ranging from about 2 to about 50 phr, advantageously from about 5 to about 30 phr. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, and cumarone-indane resins and esters such as dibutylphthalate and tricresol phosphate. Common waxes which may be used include paraffinic waxes and microcrystalline blends. Such waxes are used in amounts ranging from about 0.5 to about 3 phr. Materials used in compounding which function as an accelerator-activator include metal oxides, such as zinc oxide and magnesium oxide, which are used in conjunction with acidic materials such as fatty acid, for example, stearic acid, oleic acid, murastic acid, and the like. The amount of the metal oxide may range from about 1 to about 14 phr, advantageously from about 2 to about 8 phr. The amount of fatty acid which may be used may range from about 0 phr to about 5 phr, advantageously from about 0 phr to about 2 phr.

If desired, siliceous pigments may be used in the rubber compound applications of the present invention, including pyrogenic and precipitated siliceous pigments (silica). The siliceous pigments advantageously employed in this invention are precipitated silicas such as, for example, those obtained by the acidification of a soluble silicate, e.g., sodium silicate. Such silicas may be characterized, for example, by having a BET surface area, as measured using nitrogen gas, in the range of about 40 to about 600 m$^2$/g, and more usually in a range of about 50 to about 300 m$^2$/g. The BET method of measuring surface area is described in the *Journal of the American Chemical Society*, Volume 60, Page 304 (1930). The silica may also be typically characterized by having a dibutylphthalate (DBP) absorption value in a range of about 100 to about 400, and more usually about 150 to about 300. If desired, the silica may have an average ultimate particle size in the range of about 0.01 to about 0.05 micron, as determined by electron microscopy; although the silica particles may be even smaller, or larger, in size, if desired. Various commercially available silicas may be used, for example: silicas commercially available from PPG Industries under the Hi-Sil™ trademark with designations 210, 243, etc; silicas available from Rhone-Poulenc, with, for example, designations of Z1165MP™ and Z165GR™; and silicas available from Degussa AG with, for example, designations VN2™ and VN3™, etc.

In those instances where silica is added to the rubber, a sulfur-containing organosilicon compound is typically added as a silica coupling agent. Examples of suitable sulfur-containing organosilicon compounds are those having the formula:

Z—Alk—S$_n$—Alk—Z        (II)

in which Z is selected from the group consisting of

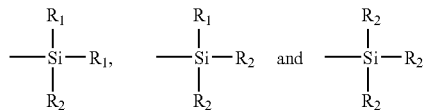

where R$_1$ is an alkyl group of 1 to 4 carbon atoms, cyclohexyl, or phenyl; R$_2$ is alkoxy of 1 to 8 carbon atoms, or cycloalkoxy of 5 to 8 carbon atoms; Alk is a divalent hydrocarbon of 1 to 18 carbon atoms; and n is an integer of 2 to 8.

Specific examples of sulfur-containing organosilicon compounds that may be used include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2''-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2''-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec. butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, and 3,3'-bis(dimethoxyphenylsilyl-2-methylpropyl) disulfide.

If desired, one or more of the 3,3'-bis(trimethoxysilylpropyl) sulfides and/or 3,3'-bis(triethoxysilylpropyl) sulfides may be used to advantage. In such an instance, as to Formula II, Z may be

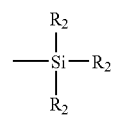

where R$_2$ is an alkoxy of 2 to 4 carbon atoms, advantageously 2 carbon atoms; Alk is a divalent hydrocarbon of 2 to 4 carbon atoms, advantageously 3 carbon atoms; and n is an integer from 3 to 5, advantageously 4.

The amount of the sulfur-containing organosilicon compound of Formula II in a rubber composition will vary depending on the level of silica that is used. Generally speaking, the amount of the compound of Formula II ranges from about 0.01 to about 1 parts by weight per part by weight of the silica. Preferably, the amount ranges from about 0.05 to about 0.4 parts by weight per part by weight of the silica.

One or more scorch retarders may be used, if desired—generally in an amount ranging from about 0.1 to about 0.5 phr. Representative examples include phthalic anhydride, salicylic acid, sodium acetate and N-cyclohexyl thiophthalimide.

Vulcanization of the rubber compositions of the present invention is generally carried out at conventional temperatures ranging from about 100° C. to 200° C. Advantageously, the vulcanization is conducted at temperatures ranging from about 110° C. to 180° C. Any of the usual vulcanization processes may be used, for example, heating in a press or mold, heating with superheated steam or hot air, or heating in a salt bath.

Accelerators are used to control the time and/or temperature required for vulcanization, and to improve the properties of the vulcanizate. In one embodiment, a single accelerator system may be used, i.e., primary accelerator. The primary accelerator(s) may be used in total amounts ranging from about 0.5 to about 4, advantageously from about 0.8 to about 1.5, phr. In another embodiment, combinations of a primary and a secondary accelerator may be used, with the secondary accelerator being used in smaller amounts (of about 0.05 to about 3 phr), in order to activate and to improve the properties of the vulcanizate. Combinations of these accelerators may have a synergistic effect, and may result in a vulcanizate that has properties somewhat better than those produced by use of either accelerator alone. In addition, delayed-action accelerators may be used. Such accelerators typically are not affected by normal processing temperatures, and produce a satisfactory cure at ordinary vulcanization temperatures. Vulcanization retarders may also be used. Suitable types of accelerators that may be used in the present invention are amines, disulfides, guanidines, thioureas, thiazoles, thiurams, sulfenamides, dithiocarbamates, and xanthates. Advantageously, the primary accelerator is a sulfenamide. If a second accelerator is used, the secondary accelerator advantageously may be a guanidine, dithiocarbamate, or thiuram compound.

One particularly beneficial group of sulfenamides is the group of compounds having the general formula:

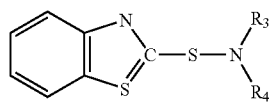

(III)

wherein $R_3$ is selected from the group consisting of hydrogen, acyclic aliphatic groups having from about 1 to 10 carbon atoms, and cyclic aliphatic groups having from about 5 to 10 carbon atoms; and $R_4$ is selected from the group consisting of cyclic aliphatic groups having from about 5 to 10 carbon atoms and a mercaptobenzothiazolyl group of the formula:

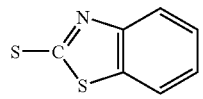

(IV)

Representative examples of the sulfenamide compounds of Formula III include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Advantageously, the sulfenamide compound is N-cyclohexyl-2-benzothiazylsulfenamide.

In situ resins may be formed in the rubber stock, and involve the reaction of cashew-nut-oil-modified novolak-type phenolic resin and a methylene donor. The term "methylene donor" is intended to mean a compound capable of reacting with the cashew-nut-oil-modified novolak-type phenolic resin to generate an in situ resin. Examples of methylene donors that are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines of the general formula:

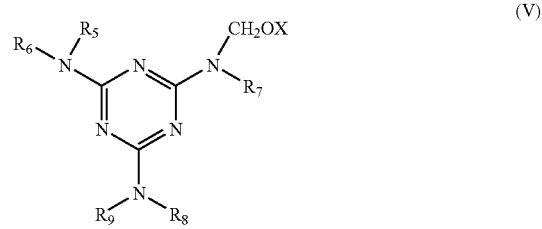

(V)

wherein X is an alkyl having from 1 to 8 carbon atoms, and $R_5$, $R_6$, $R_7$, $R_8$, and $R_9$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl)melamine, and N,N'N''-tributyl-N,N',N''-trimethylolmelamine. The N-methylol derivatives of melamine are prepared by known methods.

The amount of methylene donor that is present in the rubber stock may vary. Typically, the amount of methylene donor that is present may range from about 0.1 phr to 10 phr, advantageously from about 2 phr to 5 phr.

If desired, antioxidants and/or antiozonants, hereinafter referred to as antidegradants, may be added to the rubber stock. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines, and mixtures thereof. Specific examples of such antidegradants are disclosed in *The Vanderbilt Rubber Handbook* (1990), Pages 282 through 286. The antidegradants may be used in amounts of from about 0.25 to about 5 phr, advantageously from about 1 to about 3 phr.

When a rubber compound of the present invention is used as a wire coat or bead coat for use in a tire, the compound may contain an organo-cobalt compound which serves as a wire adhesion promoter. Any of the organo-cobalt compounds known in the art to promote the adhesion of rubber to metal may be used. Representative examples include: cobalt salts of fatty acids such as stearic, palmitic, oleic, linoleic, and the like; cobalt salts of aliphatic or alicyclic carboxylic acids having from 6 to 30 carbon atoms; cobalt chloride; cobalt naphthenate; cobalt carboxylate; and an organo-cobalt-boron complex commercially available under the designation Manobond C from Wyrough and Loser, Inc, Trenton, N.J. Manobond C™ is believed to have the structure:

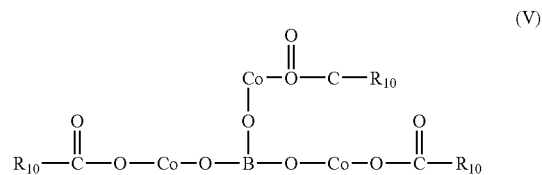

(V)

in which $R_{10}$ is an alkyl group having from 9 to 12 carbon atoms.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound on the amount of cobalt metal desired in the finished skim stock composition. If desired, the amount of organo-cobalt compound present in the skim stock composition may be sufficient to provide from about 0.01 percent to about 0.35 percent by weight of cobalt metal, based upon total weight of the rubber skim stock composition, advantageously from about 0.03 percent to about 0.15 percent by weight of cobalt metal.

The rubber compounds of the present invention may also contain a cure activator. A representative cure activator is methyl trialkyl ($C_8$–$C_{10}$) ammonium chloride, commercially available under the trademark Adogen® 464 from Sherex Chemical Company of Dublin, Ohio. The amount of activator may be used in a range of from about 0.05 to about 5 phr, if desired.

The mixing of the rubber compound may be accomplished by methods known to those having skill in the rubber mixing art. For example, the ingredients are typically mixed in at least two stages, namely at least one non-productive stage followed by a productive mix stage. The final curatives are typically mixed in the final stage (conventionally called the "productive" mix stage), in which the mixing typically occurs at a temperature, or ultimate temperature, lower than the mix temperature(s) of the preceding non-productive mix stage(s). The organothiosulfate may be mixed in one or more non-productive mix stages or in the productive mix stage. The sulfur and bismaleimide generally are mixed in the productive mix stage. The terms "non-productive" and "productive" are well known to those having skill in the rubber mixing art.

The rubber compositions of this invention may be used for various purposes. For example, they may be used for various tire compounds. Pneumatic tires may be built, shaped, molded, and cured by various methods which are known to those having skill in the art. If desired, one or more of the rubber compositions may be used as a carcass compound, wire coat, or bead coat. As will be appreciated, the tire may be a passenger tire, aircraft tire, truck tire, or the like.

WORKING EXAMPLES

The following examples of rubber compositions and processing methods are provided in order to illustrate the principles of the invention. However, the invention is not limited to these examples.

Example I

In this example, the accelerator N,N'-(m-phenylene)bis-maleimide ("MPBMI") was evaluated in rubber compositions having a reduced amount of sulfur.

The rubber compositions containing the materials shown in Table I were prepared in a lab Banbury mixer using two separate mixing stages—a non-productive mix stage and a productive mix stage. In the non-productive mix stage, the ingredients were mixed for about 3½ minutes to a drop temperature of about 150° C. In the productive stage, the ingredients were mixed for about 1½ minutes to a final compound temperature of about 110° C. The rubber composition samples are identified as Control A, and B–E. Sample A, the control, contained 5 phr oil-treated insoluble sulfur, and 0.5 phr MPBMI. In samples B–E, the amount of sulfur was reduced by 50% (2.5 phr), and increasing amounts of MPBMI were used, starting at 2.5 phr (Sample B) and working up to 5.5 phr (Sample E). The test samples were cured for about 25 minutes at about 170° C.

With reference to Table II, the samples in accordance with the invention (Samples B–E) had a significantly greater durability than that of the control (Sample A), as seen by the crack-growth data. Also, Samples B–E showed good adhesion, as evidenced by the SWAT data. Moreover, in general, this adhesion improved with increasing amounts of MPBMI, despite the fact that these samples had only half as much sulfur as that present in the control.

TABLE I

| | Samples | | | | |
|---|---|---|---|---|---|
| | Control A | B | C | D | E |
| Non-Productive Mix Stage | | | | | |
| TTR10 Natural Rubber | 100 | 100 | 100 | 100 | 100 |
| N550 Carbon Black | 57 | 57 | 57 | 57 | 57 |
| Fine Particle Hydrated Silica | 10 | 10 | 10 | 10 | 10 |
| Naphthenic/Paraffinic Process Oil | 2 | 2 | 2 | 2 | 2 |
| Rosin Oil | 1 | 1 | 1 | 1 | 1 |
| Phenol Formaldehyde Tackifying Resin | 1 | 1 | 1 | 1 | 1 |
| Cobaltous Naphthanate (10.50% cobalt metal) | 1 | 1 | 1 | 1 | 1 |
| Polymerized 1,2-dihydro-2,2,4 trimethylquinoline | 1 | 1 | 1 | 1 | 1 |
| Peptizer | 0.2 | 0.2 | 0.2 | 0.2 | 0.2 |
| 6-Para-Phenylene Diamine | 1 | 1 | 1 | 1 | 1 |
| Zinc Oxide | 5 | 5 | 5 | 5 | 5 |
| Stearic Acid | 0.5 | 0.5 | 0.5 | 0.5 | 0.5 |
| Productive Mix Stage | | | | | |
| Mixed Diaryl ParaPhenylene Diamines | 0.75 | 0.75 | 0.75 | 0.75 | 0.75 |
| N-dicyclohexyl-2-benzothiazole sulfenamide (DCBS) | 0.85 | 0.85 | 0.85 | 0.85 | 0.85 |
| N-N'-(m-phenylene)bismaleimide (MPBMI) | 0.5 | 2.5 | 3.5 | 4.5 | 5.5 |
| Hexamethylene bis-thiosulfate disodium salt dihydrate (HBTDD) | 0 | 0 | 0 | 0 | 0 |
| N-cyclohexylthiophthalimide prevulcanization inhibitor | 0.1 | 0.1 | 0.1 | 0.1 | 0.1 |
| Zinc Oxide | 3 | 3 | 3 | 3 | 3 |

TABLE I-continued

| | Samples | | | | |
|---|---|---|---|---|---|
| | Control A | B | C | D | E |
| 50% SI-69 and 50% HAF Carbon Black | 1 | 1 | 1 | 1 | 1 |
| 20% oil treated insoluble sulfur (80% Sulphur) (Insol S 80%) | 5 | 2.5 | 2.5 | 2.5 | 2.5 |

TABLE II

| | Samples | | | | |
|---|---|---|---|---|---|
| | Control A | B | C | D | E |
| MPBMI | 0.5 | 2.5 | 3.5 | 4.5 | 5.5 |
| Insol S 80% | 5 | 2.5 | 2.5 | 2.5 | 2.5 |
| Rebound 100° C. (%) | 55 | 59.2 | 57 | 61.1 | 62.9 |
| G" at 10% strain (Kpa) | 391.91 | 365.79 | 376.81 | 417.28 | 402.95 |
| Tan delta at 10% strain | 0.185 | 0.183 | 0.185 | 0.183 | 0.178 |
| RRCS individual RR (lbs) | 39.03 | 38.95 | 38.98 | 39.06 | 38.98 |
| 200% modulus (Mpa) | 6.107 | 7.462 | 7.412 | 8.744 | 9.657 |
| G' at 10% strain (Kpa) | 2120.7 | 1998.1 | 2038.7 | 2274.3 | 2267 |
| Self SS average load (N) | 81.05 | 69.59 | 75.19 | 57.74 | 58.07 |
| Self SS average load (aged) (N) | 43.8 | 53.34 | 58.12 | 55.87 | 32.69 |
| Crack growth rate (in/min) | 0.0029 | 0.0004 | 0.0004 | 0.0006 | 0.0013 |
| Crack growth (oven aged) (in/min) | 0.0062 | 0.0034 | 0.003 | 0.0032 | 0.0049 |
| Unaged RT SWAT (Newtons) | 653.33 | 559.77 | 683.09 | 626.1 | 700.58 |
| Water-aged RT SWAT (Newtons) | 146.49 | 108.54 | 114.17 | 121.88 | 121.07 |
| UNC 15% G' at 0.833 Hz (Kpa) | 222.04 | 242.33 | 230.94 | 244.11 | 273.28 |
| MDR T90 @ 170 C. | 3.6 | 3.94 | 4 | 4.25 | 4.37 |
| Tensile | 15.6 | 15.83 | 14.47 | 14.59 | 17.6 |
| Elongation | 400 | 341 | 323 | 294 | 322 |
| Hardness @ 100 C. | 56 | 59 | 60 | 64 | 64 |
| RPA G' @ 10% | 1301 | 1629 | 1747 | 1978 | 2176 |

Example II

In this example, the accelerators N,N'-(m-phenylene)bis-maleimide ("MPBMI") and hexamethylene bis-thiosulfate disodium salt dihydrate (HBTDD) were evaluated in reduced-sulfur compositions.

The rubber compositions shown in Table III were prepared in a lab Banbury mixer using mixing conditions similar to those of Example I. The rubber compositions are identified as sample F (control) and samples G–J. Sample F contained 5 phr insoluble sulfur (80%), 0.5 phr MPBMI, and 0 phr HBTDD. Samples G–J contained 2.5 phr insoluble sulfur (80%), 0.5 phr MPBMI, and increasing amounts of HBTDD, starting with 2 phr (sample G) and working up to 5 phr (sample J). The test samples were cured for about 25 minutes at 170° C.

With reference to Table IV, the samples in accordance with the invention (Samples G–J) had a significantly greater durability than that of the control (Sample F), as seen by the crack-growth data. Also, Samples G–J showed good adhesion, as evidenced by the SWAT data. Moreover, in general, this adhesion improved with increasing amounts of HBTDD, despite the fact that these samples had only half as much sulfur as that present in the control.

TABLE III

| | Samples | | | | |
|---|---|---|---|---|---|
| | Control F | G | H | I | J |
| Non-Productive Mix Stage | | | | | |
| TTR10 Natural Rubber | 100 | 100 | 100 | 100 | 100 |
| N550 Carbon Black | 57 | 57 | 57 | 57 | 57 |
| Fine Particle Hydrated Silica | 10 | 10 | 10 | 10 | 10 |
| Naphthenic/Paraffinic Process Oil | 2 | 2 | 2 | 2 | 2 |
| Rosin Oil | 1 | 1 | 1 | 1 | 1 |
| Phenol Formaldehyde Tackifying Resin | 1 | 1 | 1 | 1 | 1 |
| Cobaltous Naphthanate (10.50% cobalt metal) | 1 | 1 | 1 | 1 | 1 |
| Polymerized 1,2-dihydro-22,4 trimethylquinoline | 1 | 1 | 1 | 1 | 1 |
| Peptizer | 0.2 | 0.2 | 0.2 | 0.2 | 0.2 |
| 6-para-Phenylene Diamine | 1 | 1 | 1 | 1 | 1 |
| Zinc Oxide | 5 | 5 | 5 | 5 | 5 |
| Stearic Acid | 0.5 | 0.5 | 0.5 | 0.5 | 0.5 |

TABLE III-continued

| | Samples | | | | |
|---|---|---|---|---|---|
| | Control F | G | H | I | J |
| Productive Mix Stage | | | | | |
| Mixed Diaryl ParaPhenylene Diamines | 0.75 | 0.75 | 0.75 | 0.75 | 0.75 |
| N-dicyclohexyl-2-benzothiazole sulfenamide (DCBS) | 0.85 | 0.85 | 0.85 | 0.85 | 0.85 |
| N,N'-(m-phenylene)bismaleimide (MPBMI) | 0.5 | 0.5 | 0.5 | 0.5 | 0.5 |
| Hexamethylene bis-thiosulfate disodium salt dihydrate (HBTDD) | 0 | 2 | 3 | 4 | 5 |
| N-cyclohexylthiophthalimide prevulcanization inhibitor | 0.1 | 0.1 | 0.1 | 0.1 | 0.1 |
| Zinc Oxide | 3 | 3 | 3 | 3 | 3 |
| 50% SI-69 and 50% HAF Carbon Black | 1 | 1 | 1 | 1 | 1 |
| 20% oil treated insoluble sulfur (80% Sulphur) (Insol S 80%) | 5 | 2.5 | 2.5 | 2.5 | 2.5 |

TABLE IV

| | Samples | | | | |
|---|---|---|---|---|---|
| | Control F | G | H | I | J |
| HBTDD | 0 | 2 | 3 | 4 | 5 |
| Insol S 80% | 5 | 2.5 | 2.5 | 2.5 | 2.5 |
| Rebound 100° C. (%) | 53 | 55.3 | 56.1 | 56.2 | 57.1 |
| G" at 10% strain (Kpa) | 405.01 | 366.48 | 322.31 | 347.05 | 352.83 |
| Tan delta at 10% strain | 0.183 | 0.189 | 0.187 | 0.177 | 0.18 |
| RRCS individual RR (lbs) | 39.06 | 39.02 | 38.93 | 38.92 | 38.95 |
| 200% modulus (Mpa) | 5.670 | 6.110 | 6.250 | 6.640 | 7.040 |
| G' at 10% strain (Kpa) | 2211.1 | 1944 | 1719.7 | 1957.8 | 1956.8 |
| Self SS average load (N) | 58.87 | 104.03 | 76.14 | 77.82 | 63.41 |
| Aged self SS average load (N) | 30.46 | 43.4 | 35.37 | 60.21 | 49.72 |
| Crack growth rate (in/min) | 0.0024 | 0.001 | 0.001 | 0.0015 | 0.0014 |
| Crack growth (oven aged) (in/min) | 0.0455 | 0.0023 | 0.0016 | 0.0027 | 0.0023 |
| Unaged RT SWAT (Newtons) | 627.73 | 439 | 633.17 | 591.1 | 579.1 |
| Water-aged RT SWAT (Newtons) | 194.68 | 198.29 | 188.81 | 184.63 | 185.81 |
| UNC 15% G' at 0.833 Hz (Kpa) | 236.63 | 266.52 | 275.77 | 273.64 | 275.77 |
| MDR T90 @ 170 C. | 4.13 | 3.46 | 3.19 | 3.17 | 3.13 |
| Tensile | 12.99 | 13.52 | 13.25 | 15.44 | 13.63 |
| Elongation | 370 | 354 | 345 | 375 | 331 |
| Hardness | 57 | 56 | 58 | 57 | 60 |
| RPA G' @ 10% | 1361 | 1214 | 1252 | 1305 | 1352 |

Example III

In this example, the incorporation of hexamethylene bis-thiosulfate disodium salt dihydrate (HBTDD) at different stages of the compounding process was evaluated.

The rubber compositions containing the materials shown in Table V were prepared in a lab Banbury mixer using three separate mixing stages—two non-productive mix stages and one productive mix stage. In the first non-productive mix stage, the materials were mixed for about 5 minutes to a drop temperature of about 150° C. In the second non-productive mix stage, the ingredients were mixed for about 3 minutes to a drop temperature of about 150° C. In the productive mix stage, the ingredients were mixed for about 2 minutes to a final compound temperature of about 110° C. The rubber compositions are identified as sample K (control) and samples L–O. Sample K, the control, included 5 phr insoluble sulfur (80%), 0 phr MPBMI, and 0 phr HBTDD. The amount of insoluble sulfur (80%) was reduced, starting with 5 phr (sample K—control) and going down to 2 phr in samples N and O. Each of samples L–O included 1 phr MPBMI and 3 phr HBTDD. However, for samples L–N, the HBTDD was added during the productive mix stage; whereas for sample O, the HBTDD was added during the first non-productive mix stage. The test samples were cured for about 25 minutes at about 170° C.

With reference to Table VI, the samples in accordance with the invention (Samples L–O) had a greater durability than that of the control, especially over time, as seen by the crack-growth data. Also, Samples L–O generally showed adequate adhesion, as evidenced by the SWAT data. Moreover, with the exception of the aged-adhesion result for Sample O, long-term adhesion showed a steady increase despite decreasing amounts of sulfur (Samples L–N). When HBTDD was added in the first non-productive mix stage (Sample O), as opposed to in the productive mix stage (Sample N), long-term durability was enhanced, and long-term adhesion was diminished.

TABLE V

| | Control K | L | M | N | O |
|---|---|---|---|---|---|
| First Non-Productive Mix Stage | | | | | |
| TTR10 Natural Rubber | 80 | 80 | 80 | 80 | 80 |
| Synthetic Cis 1,4Polyisoprene | 20 | 20 | 20 | 20 | 20 |
| N550 Carbon Black | 25 | 25 | 25 | 25 | 25 |
| Fine Particle Hydrated Silica | 10 | 10 | 10 | 10 | 10 |
| Napthenic/Paraffinic Process Oil | 2.25 | 2.25 | 2.25 | 2.25 | 2.25 |
| Phenol Formaldehyde Tackifying Resin | 0.25 | 0.25 | 0.25 | 0.25 | 0.25 |
| Hexamethylene bis-thiosulfate disodium salt dihydrate (HBTDD) | 0 | 0 | 0 | 0 | 3 |
| Peptizer | 0.2 | 0.2 | 0.2 | 0.2 | 0.2 |
| Zinc Oxide | 8 | 8 | 8 | 8 | 8 |
| Stearic Acid | 2 | 2 | 2 | 2 | 2 |
| Second Non-Productive Mix Stage | | | | | |
| 20.5% cobalt neodecanoate salt | 0.5 | 0.5 | 0.5 | 0.5 | 0.5 |
| Polymerized 1,2-dihydro-2,2,4trimethylquinoline | 1 | 1 | 1 | 1 | 1 |
| Resorcinol | 4 | 4 | 4 | 4 | 4 |
| N550 Carbon Black | 32 | 32 | 32 | 32 | 32 |
| Productive Mix Stage | | | | | |
| Mixed Diaryl ParaPhenylene Diamines | 0.75 | 0.75 | 0.75 | 0.75 | 0.75 |
| Phenol Formaldehyde Tackifying Resin | 0.5 | 0.5 | 0.5 | 0.5 | 0.5 |
| N-dicyclohexyl-2-benzothiazole sulfenamide (DCBS) | 0.62 | 0.62 | 0.62 | 0.62 | 0.62 |
| Hexamethoxymethylmelamine | 3 | 3 | 3 | 3 | 3 |
| N,N'-(m-phenylene)bismaleimide (MPBMI) | 0 | 1 | 1 | 1 | 1 |
| Hexamethylene bis-thiosulfate disodium salt dihydrate (HBTDD) | 0 | 3 | 3 | 3 | 0 |
| N-cyclohexylthiophthalimide prevulcanization inhibitor | 0.2 | 0.2 | 0.2 | 0.2 | 0.2 |
| 20% oil treated insoluble sulfur (80% Sulphur) (Insol S 80%) | 5 | 4 | 3 | 2 | 2 |

TABLE VI

| | Control K | L | M | N | O |
|---|---|---|---|---|---|
| MPBMI | 0 | 1 | 1 | 1 | 1 |
| HBTDD | 0 | 3 | 3 | 3 | 3 |
| Insol S 80% | 5 | 4 | 3 | 2 | 2 |
| Rebound 100° C. (%) | 45.2 | 47.2 | 45.7 | 43.8 | 48.6 |
| G" at 10% strain (Kpa) | 708.09 | 661.82 | 641.25 | 522.34 | 539.17 |
| Tan delta at 10% strain | 0.25 | 0.238 | 0.258 | 0.246 | 0.224 |
| RRCS individual RR (lbs) | 40.01 | 39.87 | 39.9 | 39.41 | 39.34 |
| 200% modulus (Mpa) | 5.680 | 6.943 | 6.392 | 5.497 | 6.195 |
| G' at 10% strain (Kpa) | 2837.3 | 2775.6 | 2486 | 2125.5 | 2406.6 |
| Self SS average load (N) | 133.73 | 94.97 | 101.84 | 131.57 | 119.59 |
| Aged self SS average load (N) | 58.18 | 52.28 | 63.3 | 71.07 | 63.71 |
| Crack growth rate (in/min) | 0.0025 | 0.024 | 0.0016 | 0.0011 | 0.0009 |
| Crack growth (oven aged) (in/min) | 0.0556 | 0.017 | 0.008 | 0.0027 | 0.0015 |
| Unaged RT SWAT (Newtons) | 642.82 | 640.77 | 550.89 | 517.22 | 683.44 |
| Water-aged RT SWAT (Newtons) | 403.81 | 344.28 | 365.39 | 375.39 | 149.38 |
| UNC 15% G' at 0.833 Hz (Kpa) | 148.03 | 204.61 | 184.68 | 168.31 | 236.99 |
| MDR T90 @ 170 C. | 4.57 | 4.29 | 4.24 | 4.69 | 5.41 |
| Tensile | 11.52 | 12.22 | 11.41 | 11.05 | 10.93 |
| Elongation | 335 | 305 | 315 | 329 | 319 |
| Hardness @ 100 C. | 67 | 70 | 65 | 66 | 65 |
| RPA G' @ 10% | 1991 | 2027 | 1787 | 1621 | 1748 |

What is claimed is:

1. A rubber compound comprising:
   (A) a rubber selected from the group consisting of natural rubber, a rubber derived from one or more diene monomers, and mixtures thereof;
   (B) from about 0.05 to about 10 phr of an organothiosulfate; and
   (C) from about 0.1 to about 10 phr of a bismaleimide compound selected from the group consisting of N,N'-ethylenebismaleimide, N,N'-hexamethylenebismaleimide, N,N'-(m-phenylene)bismaleimide, N,N'-(p-phenylene)-bismaleimide, N,N'-(p-tolylene)bismaleimide, N,N'-(oxydi-p-phenylene)bismaleimide, α,α-bis-(4-p-phenylene)-bismaleimide, N,N'-m-xylylene-bis-citraconic imide, and α,α-bis-(4-maleimidophenyl)-meta-diisopropylbenzene.

2. The rubber compound of claim 1 wherein the rubber derived from the one or more diene monomers is selected from the group consisting of synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene, and isoprene, copolymers of styrene and butadiene, and blends thereof.

3. The rubber compound of claim 1 wherein said organothiosulfate is selected from the group consisting of salts and hydrated salts: of n-butylthiosulfate, n-pentylthiosulfate, isopentylthiosulfate, n-hexylthiosulfate, isohexylthiosulfate, n-heptylthiosulfate, isooctylthiosulfate, 2-ethylhexylthiosulfate, and the straight- and branched-chain dodecylthiosulfates, hexadecyl thiosulfates, and octadecylthiosulfates; of prop-2-enylthiosulfate, but-2-enylthiosulfate, pent-3-enylthiosulfate, hex-3-enylthiosulfate, oct-3-enylthiosulfate, and dodec-4-enylthiosulfate; of 3-chloropropylthiosulfate, 4-chlorobutylthiosulfate, 6-chlorohexylthiosulfate, and 10-chlorodecylthiosulfate; of benzylthiosulfate, 1, phenylethylthiosulfate, 2-phenylethylthiosulfate, 4-phenylbutylthiosulfate, 3-phenylpentylthiosulfate and the various isomeric phenyloctyl-, phenylnonyl-, and phenyldodecylthiosulfates; of 2,5-dihydroxyphenylthiosulfate; of ethylene bisthiosulfate, pentamethylene-1,4-bisthiosulfate, hexamethylene-1,6-bis thiosulfate, heptamethylene-1,7-bis thiosulfate, octamethylene-1,8-bis thiosulfate, nonamethylene-1,9-bis thiosulfate, decamethylene-1,10-bis thiosulfate, dodecamethylene-1,12-his thiosulfate, and hexadecamethylene-1,16-bis thiosulfate; of but-2-ene-1,4-bis thiosulfate, pent-2-ene-1,5-bis thiosulfate, hex-3-ene-1,6-bis thiosulfate, oct-4-ene-1,8-bis thiosulfate, octa-2,6-diene-1,8-bis thiosulfate, and octa-3,5-diene-1,8-bis thiosulfate.

4. The rubber compound of claim 3 wherein the salt or hydrated salt includes one or more of sodium, magnesium, calcium, barium, zinc, cobalt, and nickel.

5. The rubber compound of claim 1 wherein said organothiosulfate is hexamethylene-1,6-bis thiosulfate.

6. The rubber compound of claim 1 wherein said bismaleimide is N,N'-(m-phenylene)bismaleimide.

7. The rubber compound of claim 1 wherein said bismaleimide is N,N'-(m-phenylene)bismaleimide and said organothiosulfate is hexamethylene-1,6-bis thiosulfate.

8. The rubber compound of claim 1 wherein a sulfur vulcanizing agent is present and is selected from the group consisting of elemental sulfur, an amine disulfide, polymeric polysulfide and sulfur olefin adducts.

9. The rubber compound of claim 1 further comprising a sulfur vulcanizing agent present in an amount ranging from about 0.75 to about 5 phr.

10. The rubber compound of claim 1 wherein said bismaleimide is N,N'-(m-phenylene)bismaleimide, said organothiosulfate is hexamethylene-1,6-bis thiosulfate, and elemental sulfur is present in an amount ranging from about 0.75 to about 5 phr.

11. The rubber compound of claim 1 in the four of a tire, hose, belt, or shoe sole.

12. The rubber compound of claim 1 in the form of a wire coat compound.

13. A rubber-metal composite comprising a rubber compound in contact with a metal surface, said rubber compound comprising:
   (A) a rubber selected from the group consisting of natural rubber, a rubber derived from a one or more diene monomers and mixtures thereof;
   (B) from about 0.05 to about 10 phr of an organothiosulfate; and
   (C) from about 0.1 to about 10 phr of a bismaleimide compound selected from the group consisting of N,N'-ethylenebismaleimide, N,N'-hexamethylenebismaleimide, N,N'-(m-phenylene)bismaleimide, N,N'-(p-phenylene)-bismaleimide, N,N'-(p-phenylene)bismaleimide, N,N'-(oxydi-p-phenylene)bismaleimide, α,α-bis-(4-p-phenylene)-bismaleimide, N,N'-m-xylylene-bis-citraconic imide, and α,α-bis-(4-maleimidophenyl)-meta-diisopropylbenzene.

14. A tire comprising the rubber-metal composite of claim 13.

15. A low sulfur rubber compound comprising:
   (A) a rubber selected from the group consisting of natural rubber, a rubber derived from one or more diene monomers and mixtures thereof;
   (B) from about 0.05 to about 10 phr of an organothiosulfate;
   (C) from about 0.1 to about 10 phr of a bismaleimide compound selected from the group consisting of N,N'-ethylenebismaleimide, N,N'-hexamethylenebismaleimide, N,N'-(m-phenylene)bismaleimide, N,N'-(p-phenylene)-bismaleimide, N,N'-(p-tolylene)bismaleimide, N,N'-(oxydi-p-phenylene)bismaleimide, α,α-bis-(4-p-phenylene)-bismaleimide, N,N'-m-xylylene-bis-citraconic imide, and α,α-bis-(4-maleimidophenyl)-meta-diisopropylbenzene; and
   (D) from about 0.5 to about 7 phr of a sulfur vulcanizing agent.

* * * * *

UNITED STATES PATENT AND TRADEMARK OFFICE
CERTIFICATE OF CORRECTION

| | | |
|---|---|---|
| PATENT NO. | : 7,417,084 B2 | Page 1 of 1 |
| APPLICATION NO. | : 11/021342 | |
| DATED | : August 26, 2008 | |
| INVENTOR(S) | : Thomas Holden Hoopes | |

It is certified that error appears in the above-identified patent and that said Letters Patent is hereby corrected as shown below:

Column 1, line 37, change "discreet" to --discrete--

Column 2, line 38, change "isopentyithiosulfate" to --isopentylthiosulfate--

Column 2, line 39, change "n-heptyithiosulfate" to --n-heptylthiosulfate--

Column 3, line 1, change "typw" to --type--

Column 3, line 26, change "N,N" to --N,N'--

Column 3, line 40, change "N,N" to --N,N'--

Column 4, line 54, change "Representatives" to --Representative--

Column 11, Table III, change "22,4" to --2,2,4--

Column 17, line 10, CLAIM 1, change "hexamethylenebismalemide" to --hexamethylenebismaleimide--

Column 18, line 16, CLAIM 11, change "four" to --form--

Column 18, line 32, CLAIM 13, change "(p-phenylene)" to --(p-tolylene)--

Signed and Sealed this
Nineteenth Day of July, 2011

David J. Kappos
*Director of the United States Patent and Trademark Office*